United States Patent
Van Leeuwen

(10) Patent No.: US 8,611,744 B2
(45) Date of Patent: Dec. 17, 2013

(54) MONITORING SYSTEM EMPLOYING CARRIER RECOVERY

(75) Inventor: Michael Francis Van Leeuwen, Bethseda, MD (US)

(73) Assignee: Infinera Corporation, Sunnyvale, CA (US)

( * ) Notice: Subject to any disclaimer, the term of this patent is extended or adjusted under 35 U.S.C. 154(b) by 220 days.

(21) Appl. No.: 12/982,933

(22) Filed: Dec. 31, 2010

(65) Prior Publication Data

US 2012/0170926 A1    Jul. 5, 2012

(51) Int. Cl.
*H04J 14/00* (2006.01)

(52) U.S. Cl.
USPC ............................ 398/76; 398/69; 398/204

(58) Field of Classification Search
USPC .............. 398/203–204, 207, 210–212, 69, 76
See application file for complete search history.

(56) References Cited

U.S. PATENT DOCUMENTS

| | | | |
|---|---|---|---|
| 4,916,705 A * | 4/1990 | Glance | 372/20 |
| 2002/0167670 A1* | 11/2002 | Baney et al. | 356/451 |
| 2010/0074632 A1* | 3/2010 | Zhou | 398/208 |
| 2011/0150503 A1* | 6/2011 | Winzer | 398/202 |
| 2012/0183297 A1* | 7/2012 | Rohde et al. | 398/90 |
| 2012/0224865 A1* | 9/2012 | Brown | 398/183 |

\* cited by examiner

*Primary Examiner* — Dzung Tran
(74) *Attorney, Agent, or Firm* — Ross M. Carothers; David L. Soltz

(57) ABSTRACT

The present disclosure provides a system, apparatus and method to provide for monitoring of characteristics of optical signals, as part of wavelength division multiplexed signals for example, transmitted over a network infrastructure. The characteristics of each optical signal may be monitored and maintained at desired values in order to optimize system performance. A system including a coherent detector, as part of a coherent receiver for example, may be employed to associate each transmitted optical signal with a modulated source. Control signals generated by the system can then be provided to elements of the modulated source to control characteristics, such as optical power, optical frequency, and optical phase, for example, of the transmitted optical signal.

17 Claims, 10 Drawing Sheets

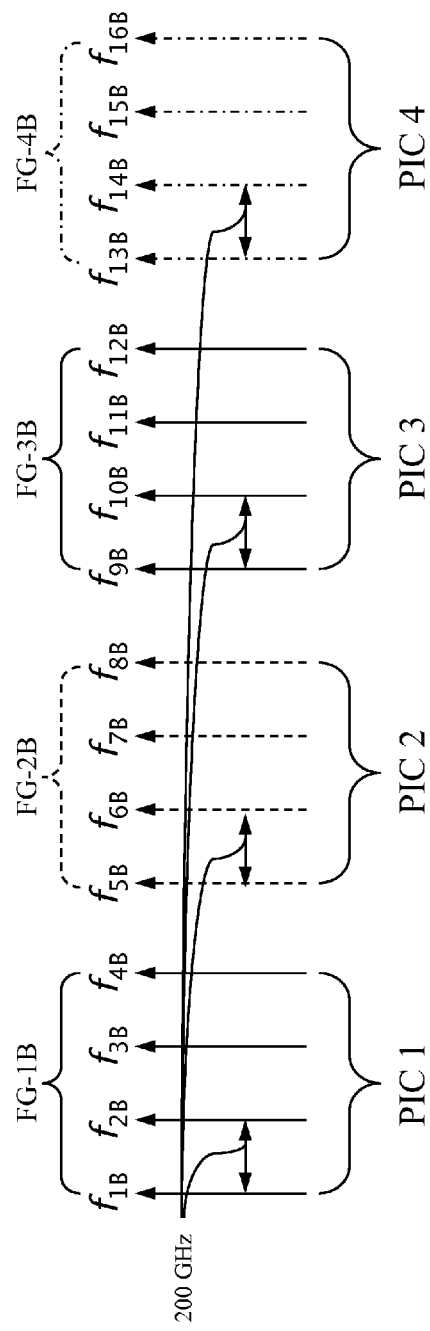
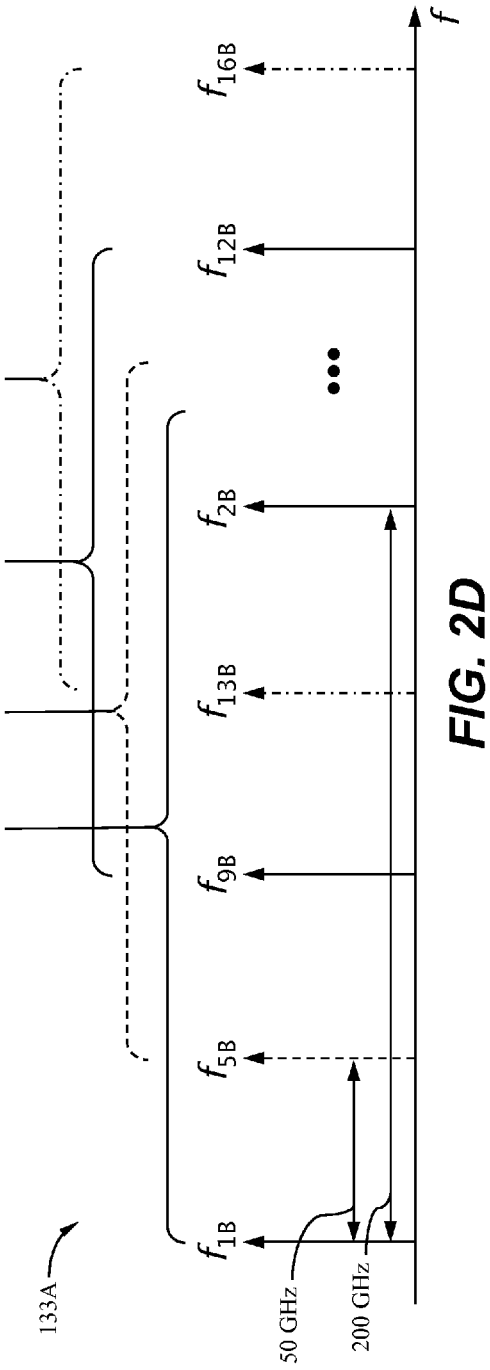
FIG. 2C
FIG. 2D

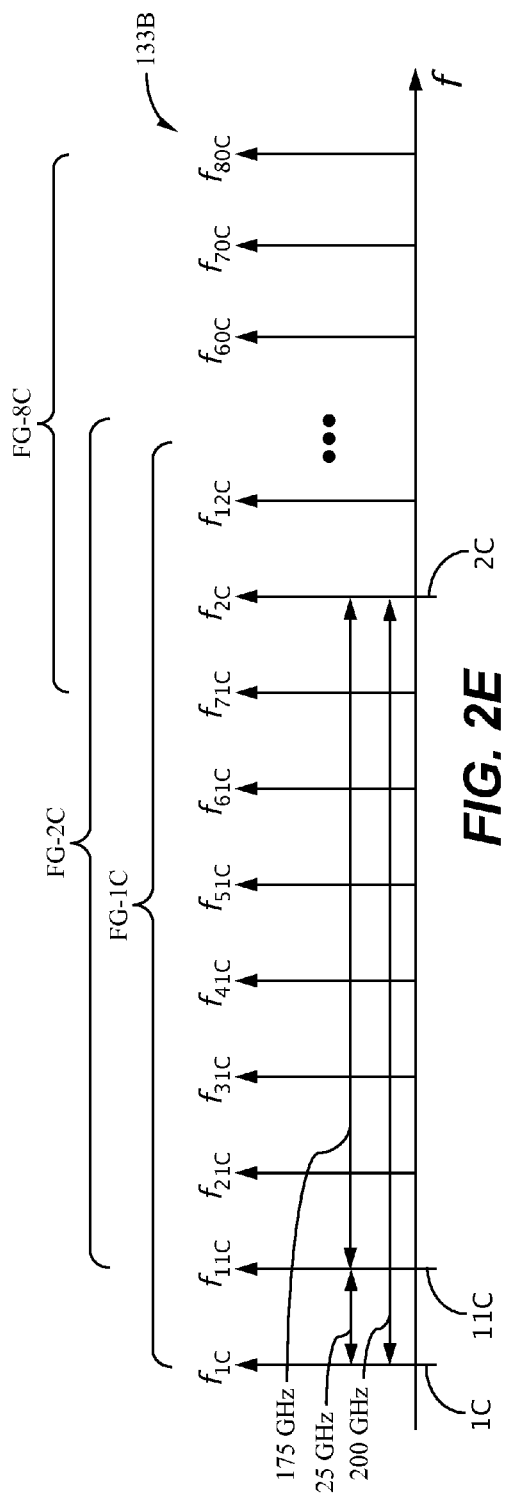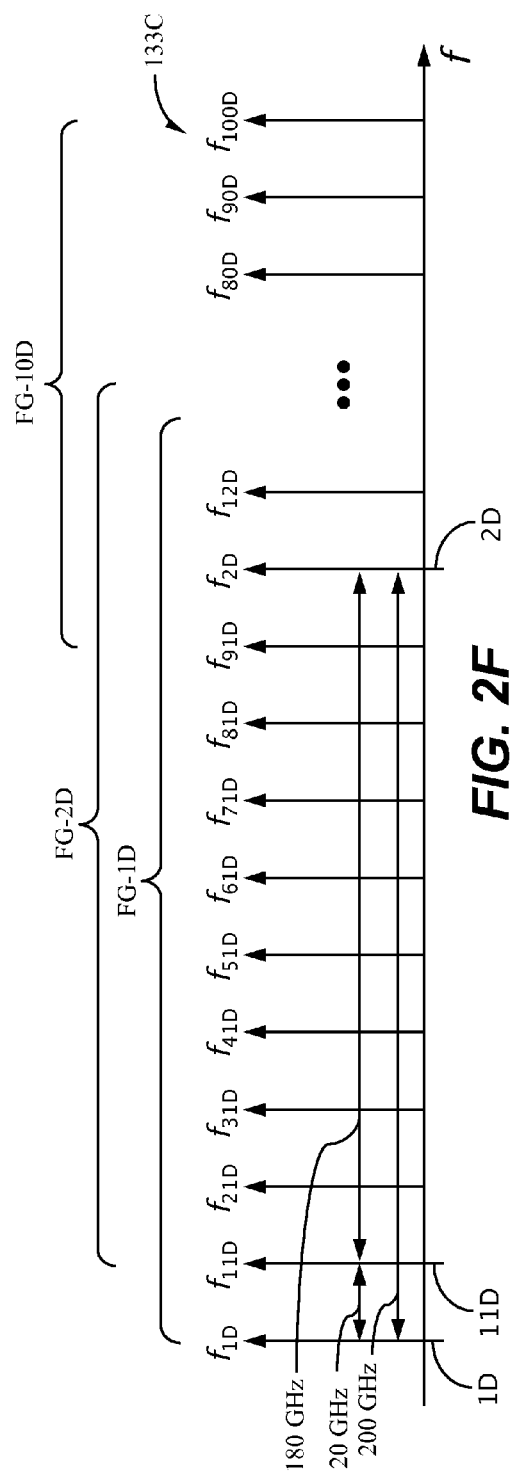

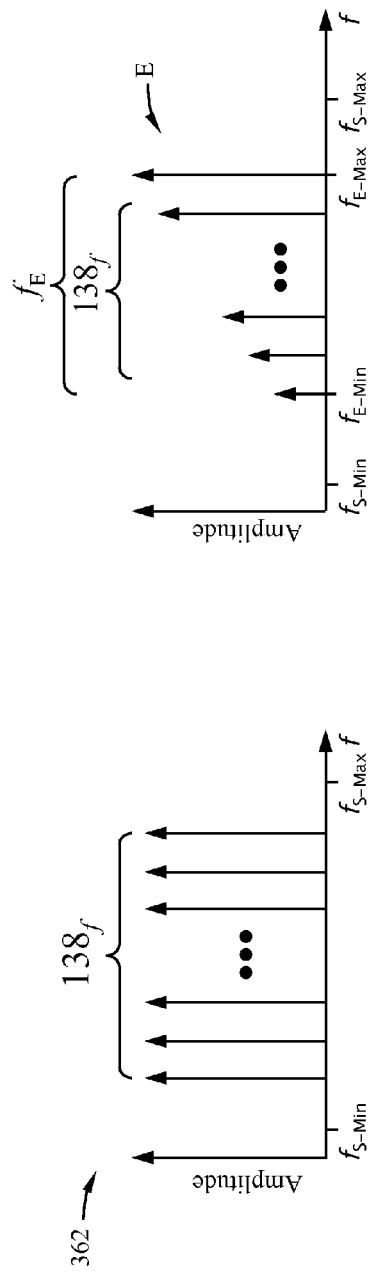
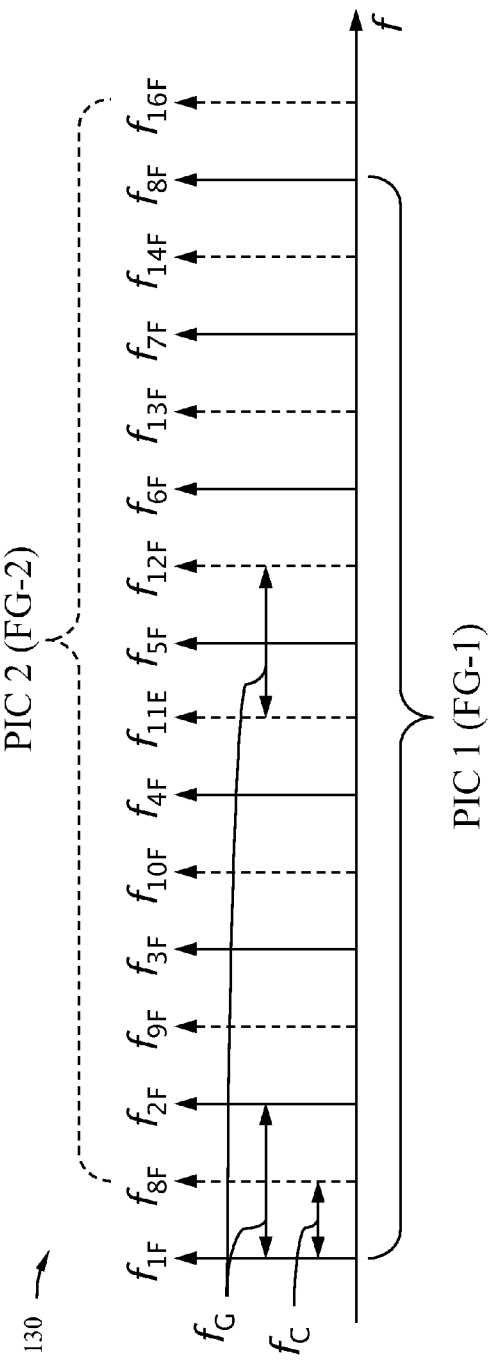
FIG. 3C
FIG. 3D
FIG. 4A

MONITORING SYSTEM EMPLOYING CARRIER RECOVERY

BACKGROUND

Wavelength division multiplexed (WDM) optical communication systems are known to include one or more photonic integrated circuits (PICs) in which multiple optical signals, each having a different wavelength or associated carrier frequency, are combined into a modulated output signal for transmission over an optical fiber. Such systems typically include transmitters having a laser supplying light at a carrier frequency, a modulator configured to modulate the light output of the laser, and an optical combiner to combine each of the modulated outputs into the modulated output signal. The carrier frequencies associated with each of the modulated outputs, collectively the frequencies defining a carrier frequency grid, or simply frequency grid, may be spectrally spaced from each other to define a channel spacing with respect to the grid. The WDM optical communication system may include multiple PIC devices, the outputs of each being spectrally combined or interleaved to form a combined output signal for transmission over an optical fiber. The frequency grids of each of such PIC devices may be spectrally spaced or offset from each other such that a portion of each frequency grid overlaps a portion of the remaining frequency grids. Thus, each adjacent signal channel may be from different wavelength grids, the adjacent signal channels defining a channel spacing with respect to the interleaved signal.

Historically, such modulated output signals were amplitude or intensity modulated. More recently, however, more advanced transmission systems, such as coherent systems, use more complex modulation formats. Such complex modulation formats may employ phase-shift keying (PSK), for example, which offer higher capacity than the intensity modulated signals. Some examples of modulation formats which incorporate PSK include binary phase shift keying ("BPSK"), quadrature phase shift keying ("QPSK"), differential phase-shift keying ("DPSK"), and polarization multiplexed differential phase-shift keying (PM-DPSK), to name a few.

As with other transmission systems, coherent transmission systems may provide for a data capacity over a corresponding link of a given distance or reach, the capacity provided within a margin, such as a bit error rate for example. However, links employed for transmission of optical signals may include impairments which may limit the performance of the transmission system. Such impairments may include, for example, various forms of dispersion due to random imperfections and asymmetries of the optical fiber associated with the link, such as polarization mode dispersion or cross phase modulation chromatic dispersion. For purposes herein, impairments shall include any linear or non-linear impairment which may impact the integrity of a transmitted optical signal. Such impairments may be associated with the optical signal itself, such as optical power or a modulation scheme employed to modulate the optical signal, or may be associated with structure of the transmission system, such as an optical fiber over which the optical signal is transmitted.

What is needed is a system which monitors characteristics of optical signals, as part of a wavelength division multiplexed signal for example, in order to optimize the optical signals in light of impairments which may be present.

SUMMARY

The present disclosure provides a system, apparatus and method to dynamically provide variable channel spacing associated with multiplexed or combined signals transmitted over a network infrastructure, wavelength division multiplexed signals for example. In a first aspect of the embodiments of this disclosure, an apparatus is provided which includes first, second, and third circuits, the first circuit including an oscillator and a filter. The oscillator may supply light having a frequency which sweeps at a sweep rate from a first one of a plurality of frequencies to a second one of the plurality of frequencies. A first portion of the light may be provided to the filter which filters the first portion of the light to provide a filtered output having an intensity peak at a third one of the plurality of frequencies. The second circuit may be configured to receive a second portion of the light from the first circuit on a first input and an optical signal on a second input. The optical signal may have a fourth one of the plurality of frequencies, the second circuit configured to provide an output signal in response to the second portion of the light and the optical signal. The output signal is indicative of the fourth one of the plurality of frequencies. The third circuit may be configured to provide a control signal based on, at least, the filtered output of the first circuit, the output signal of the second circuit, and the sweep rate, where the control signal is configured to control a corresponding one of a plurality of characteristics associated with said optical signal.

In certain embodiments, the filter includes an etalon configured to receive the first portion of the light and provide the filtered output as a filtered optical output including the intensity peak at the third of the plurality of frequencies. The first circuit may also include a photodetector configured to receive the filtered optical output and convert the filtered output into a filtered electrical output, the filtered electrical output being provided by the first circuit as the filtered output. The first circuit may also include an optical coupler having an input configured to receive the light and provide the first portion of the light at a first output of the optical coupler and a second portion of the light at a second output of the optical coupler.

In other embodiments, the oscillator is a laser and the light includes a first light supplied by a first end of the laser and a second light supplied from a second end of the laser, the first portion of the light being the first light. In certain embodiments, the oscillator may be a distributed feedback laser or a distributed Bragg reflector laser. In yet other embodiments the second circuit is a coherent detector, which may include a 90-degree optical hybrid circuit configured to receive the optical signal and the second portion of the light for processing thereof.

In still other embodiments, the plurality of characteristics are selected from a group including an optical power of the optical signal, a phase of the optical signal, a carrier frequency of the optical signal, a carrier frequency of an output of the laser, a wavelength of the optical signal, a wavelength of the output of the laser, the gain of the amplitude varying element, a bias of the laser, and a bias of the modulator. In yet other embodiments, the apparatus includes a thermal device configured to adjust a temperature of the laser, the temperature of the laser being set in response to the control signal. The thermal device may be a heater. The thermal device may be a thermo-electric cooler.

In some embodiments, the intensity peak of the filtered output is a first of a plurality of intensity peaks of the filtered output, each of the plurality of intensity peaks being associated with a respective one of the plurality of frequencies. Each intensity peak may have an amplitude which is different from the other ones of the plurality of intensity peaks.

In another aspect of the embodiments of this disclosure, an apparatus is provided which includes first, second, and third circuits. The first circuit may include an oscillator and a filter, the oscillator supplying light having a frequency which sweeps at a sweep rate from a first of a plurality of frequencies to a second of the plurality of frequencies. A first portion of the light may be provided to the filter which filters the first portion of the light to provide a filtered output having an intensity peak at a third of the plurality of frequencies. The second circuit may be configured to receive a second portion of the light from the first circuit on a first input and a wavelength division multiplexed optical signal on a second input. The wavelength division multiplexed optical signal may include a plurality of optical signals, each including a corresponding one of a group of the plurality of frequencies. In response to the second portion of the light and the group of the plurality of frequencies, the second circuit may provide an output signal, the output signal indicative of the group of the plurality of frequencies of the optical signal. The third circuit may be configured to provide a plurality of control signals in response to the filtered output of the first circuit, the output signal of the second circuit, and the sweep rate. Each of the plurality of control signals may be configured to control a corresponding one of a plurality of characteristics associated with a corresponding one of the plurality of optical signals.

Other objects, features and advantages of the various embodiments of the disclosure will be apparent from the drawings, and from the detailed description that follows below.

BRIEF DESCRIPTION OF THE DRAWINGS

The accompanying drawings, which are incorporated in and constitute a part of this specification, illustrate one or more implementations described herein and, together with the description, explain these implementations. These drawings are intended to be illustrative, not limiting. In the drawings wherein like reference symbols refer to like parts:

FIG. 2C is a depiction of the carrier frequencies of outputs signals from four photonic integrated circuits prior to the optical output signals being combined;

FIG. 2D is a representative example of the combined optical output signals of FIG. 2C.

FIG. 2E is another representative example of another combined optical output, according to certain aspects of the embodiments of this disclosure;

FIG. 2F is yet another representative example of another combined optical output, according to certain aspects of the embodiments of this disclosure;

FIG. 3C is an exemplary representation of a signal output at a first point within the carrier frequency controller processing circuit of FIG. 3A;

FIG. 3D is a signal output at a second point within the carrier frequency controller processing circuit of FIG. 3A;

FIG. 4A is a depiction of exemplary frequency grids which may be processed by the exemplary carrier frequency controller processing circuit of FIG. 3A;

DETAILED DESCRIPTION OF THE EMBODIMENTS

The present disclosure provides a system, apparatus and method to provide for monitoring of characteristics of optical signals, as part of wavelength division multiplexed signals for example, transmitted over a network infrastructure. The characteristics of the optical signals may be monitored and maintained at desired values in order to optimize system performance. A system including a coherent detector, as part of a coherent receiver for example, may be employed to associate each transmitted optical signal with a modulated source. Control signals generated by the system can then be provided to elements of the modulated source to control characteristics, such as optical power, optical frequency, and optical phase, for example, of the transmitted optical signal. Such elements may include, but are not limited to, a laser, a modulator, an amplitude varying element, a thermal device configured to control a temperature of the laser. Characteristics of the transmitted optical signal may be maintained to overcome impairments associated with the network infrastructure over which the optical signal is transmitted.

The following description is set forth for purpose of explanation in order to provide an understanding of the various embodiments of the disclosure. However, it is apparent that one skilled in the art will recognize that these embodiments, some of which are described below, may be incorporated into a number of different systems and devices. Additionally, the embodiments of the present disclosure may include certain aspects each of which may be present in hardware, software, or firmware. Structures and devices shown in block diagram in the figures are illustrative of exemplary embodiments and are meant to avoid obscuring certain aspects of the embodiments of the disclosure. Furthermore, connections between components within the figures are not intended to be limited to direct connections. Rather, data between these components may be modified, re-formatted or otherwise changed by intermediary components.

Figure 1A:
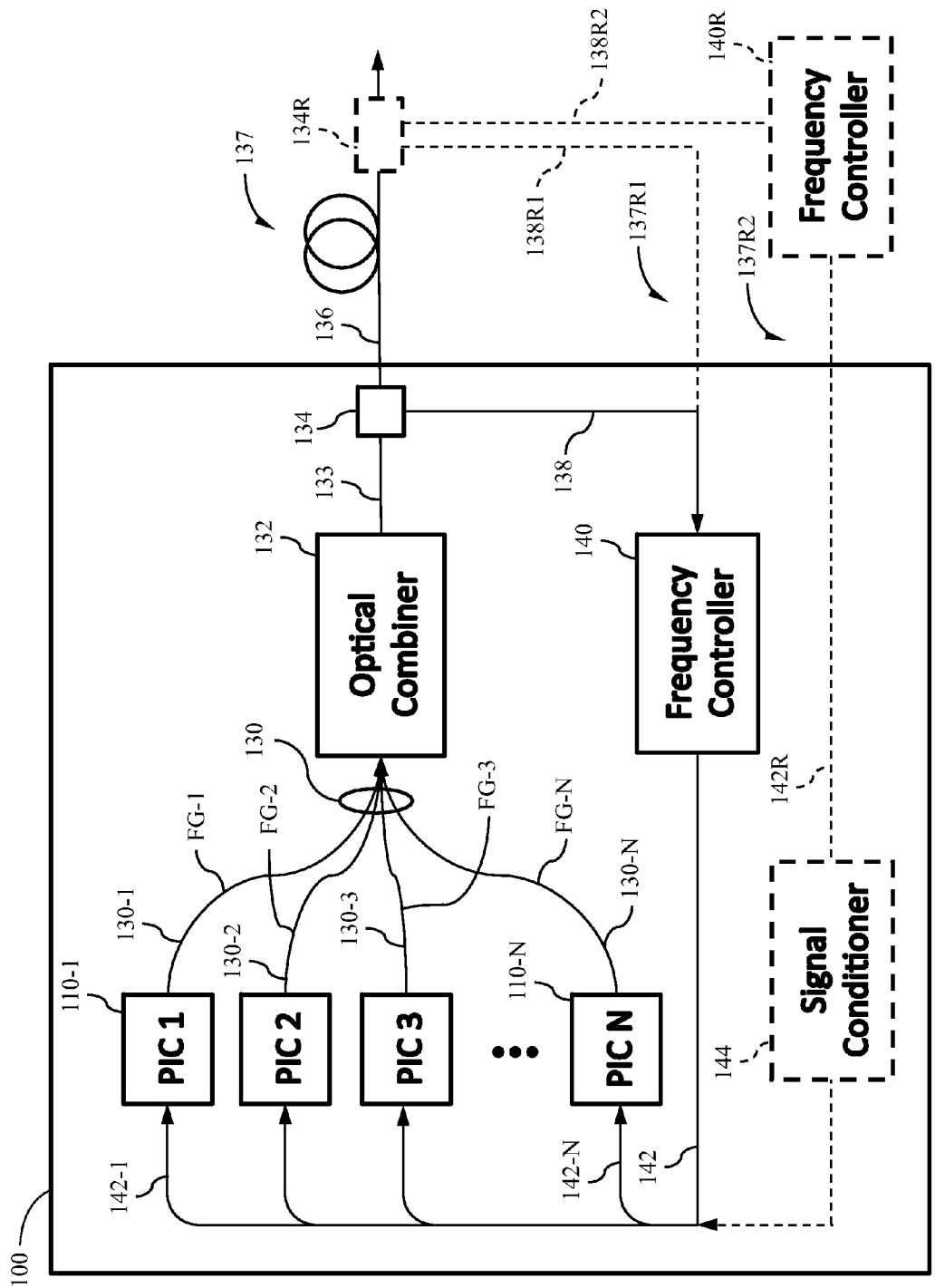
FIG. 1A is a general block diagram of a transmission system, according to certain aspects of the embodiments of this disclosure.

FIG. 1A illustrates an exemplary transmitter or transmission system 100 including a number, N, of photonic integrated circuits (PICs) 110-1 through 110-N, collectively referred to as photonic integrated circuits 110 or PICs 110. As discussed in greater detail with respect to FIG. 1B below, each of the PICs 110 provides a corresponding optical output signal, identified as optical output signals 130-1 through 130-N, collectively referred to as optical output signals 130. Each of the optical output signals 130 may include a number of optical signals, each having a different carrier frequency, as discussed in greater detail below with respect to FIG. 1B. The carrier frequencies, as part of each of the output signals 130, define a frequency grid, identified as FG-1 through FG-N, collectively referred to as frequency grids FG. The optical output signals 130 may then be provided to an optical combiner 132 which combines the signals 130 into a combined output signal 133, such as a WDM signal, suitable for transmission. As part of the combined output signal 133, each of the channels of each of the optical output signals 130 is spectrally spaced from adjacent channels, referred to as channel spacing. The optical combiner 132 may then combine the received optical outputs 130 into a combined output signal 133. Optical combiner 132 may be any suitable optical combiner, such as a power combiner or a flexible wavelength muxing combiner, where the combiner can be tuned to match the incoming carrier frequencies of the optical signals 130.

The combined output signal 133 may then be provided to an optical tap 134 which may direct a majority of the combined output signal 133 to pass as output signal 136, for transmission over an optical network 137 for example, while diverting a signal 138, which is a portion of the combined output signal 133, to a carrier frequency controller circuit 140. The carrier frequency controller 140, as discussed in more detail with respect to FIG. 3A, may provide a plurality of control signals 142 to the PICs 110, e.g. control signals 142-1 through 142-N. In this way, carrier frequency controller 140 may detect the carrier frequencies of the signals 130, as part of combined signal 133, and provide control signals 142 to maintain proper channel spacing, as is discussed in greater detail with respect to FIG. 1B.

While FIG. 1A illustrates the origin of the optical signal 138 as being part of the transmission system 100, the origin of the optical signal 138 may be elsewhere. For example, a remote tap 134R may divert a portion of the transmitted signal 136, and supply the portion to the carrier frequency controller 140 processing circuitry as signal 138R1. In that case, the signal 138R1 may be provided to the carrier frequency controller 140 via transmission link 137, or through another optical line or path 137R1, as depicted. Alternatively, the wavelength controller 140 may be remotely located with respect to the transmission system 100, as represented by optional carrier frequency controller 140R (in dashed line). In this alternative approach, a portion of the transmitted optical signal 136 may be provided to the optional carrier frequency controller 140R as a signal 138R2. carrier frequency controller 140R may then provide control signals 142R back to the transmission system 100, over path 137R2 for example.

The control signals 142R may be directed to the PICs 110 as represented by control signals 142 or, alternatively, to an optional signal conditioner 144 which may include circuitry to process, or provide signal conditioning to, the control signals 142R. For example, the control signals 142R may be optical or electrical digital signals which represent desired changes with respect to the output carrier frequencies, and ultimately the corresponding channel spacing, associated with optical signals 130. Thus, the control signals 142R may be processed by optional signal conditioner 144 to determine which carrier frequencies are to be modified. Alternatively, control signals 142R may be analog signals which represent desired changes with respect to the output carrier frequencies, as part of optical signals 130. The optional signal conditioner 144 may include circuitry which conditions the analog signals by filtering undesired signals from the control signals 142R or providing a desired gain to the control signals 142R.

While FIG. 1A depicts a tap 134 (or tap 134R) to direct a portion 138 of the output signal 133 to the carrier frequency controller 140, an optical switch (not shown) may be used in place of tap 134. The optical switch may be used to switch the output signal 133 and direct the signal 133 to the carrier frequency controller 140, as signal 138 for example, at various time periods to ensure the carrier frequencies of the output signals 130 are maintained at desired channel spacings. Such time periods may include, for example, initial system power-up and initialization, a specific time intervals during operation, or when an operational aspect of the transmission system 100 changes. Such operational aspects may include, but are not limited to, modulation format changes of one or more PIC 110 outputs 130, link 137 changes which result in a corresponding change in a transmission distance, or a change in a capacity requirement associated with link 137. Also, additional optical elements may be included throughout the transmission system 100, if desired, to provide additional amplification or attenuation of one or more of the signals 130, 133, 136, 138, 142, for example.

Figure 1B:
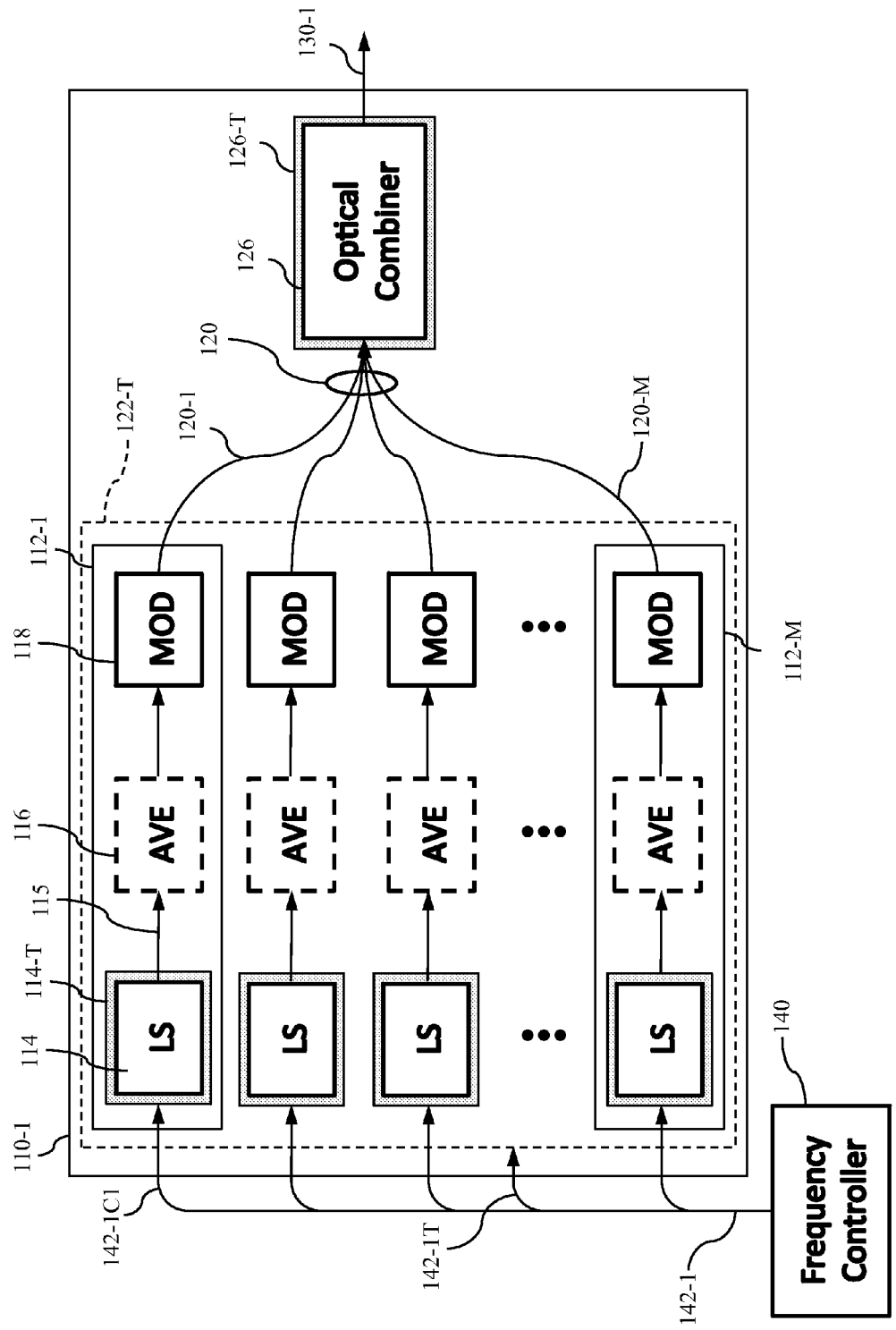
FIG. 1B is a block diagram of additional detail related to photonic integrated circuits of the transmission system of FIG. 1A.

Turning to FIG. 1B, each PIC 110 will be discussed in greater detail. FIG. 1B depicts a block diagram of a first PIC 110-1 of the transmission system 100, each remaining PIC 110-2 through 110-N may be similar to PIC 110-1. PIC 110-1 may include a number of signal channels, signal channels 112-1 through 112-M for example, collectively referred to as signal channels 112. Each of the signal channels 112 may include a light source 114, an optional amplitude varying element (AVE) 116 (in dashed line) and a modulator 118. The light source 114 may be any suitable light source, such as a distributed feedback (DFB) laser or a distributed Bragg reflector (DBR) laser for example. The light source 114 provides light 115 at a desired wavelength, within the C-Band range of 1525 nm to 1565 nm for example. The light 115 is provided to the modulator 118, optionally amplified or attenuated by the AVE 116, if present. For example, the light may be amplified by the AVE 116 such that the light 115 each of the signal channels 112 have similar optical powers, or otherwise have a desired power profile across the signal channels 112 where each optical power associated with each of the signal channels 112 may be similar or different from optical powers of the remaining signal channels 112.

The modulator 118 modulates the light 115 in accordance with a data stream to provide a modulated output 120 representative of the data stream once received and demodulated in a remote receiver, as is known in the art. The modulator 118 may be any suitable modulator, such as a Mach-Zehnder modulator or an electro-absorption modulator, which modulates the corresponding light 115, preferably in a phase-shift keying modulation format, such as binary phase-shift keying (BPSK) format or quadrature phase-shift keying (QPSK) format, for example. If a polarization multiplexed modulation format is preferred, modulator 118 may be a first of two modulators 118A, 118B (not shown) per channel 112. The first modulator 118A may supply a first modulated signal 120A which will be associated with a first polarization state or mode, such as a Transverse Electric (TE) or a Transverse Magnetic (TM) mode. A second modulator 118B may be provided to supply a second modulated signal 120 which will be associated with a second polarization state or mode. More information regarding polarization multiplexed transmission systems may be found in copending application Ser. No. 12/646,952 entitled "Transmitter Photonic Integrated Circuit" and Ser. No. 12/572,179 entitled "Coherent Optical Receiver", both of which are incorporated herein by reference in their entirety.

Each of the signal channels 112 may then provide an associated modulated output 120, e.g. 120-1 through 120-M, to an optical combiner 126 which combines the modulated outputs 120 into the output signal 130-1, and provided as an output of the PIC 110-1. The optical combiner 126 may be any suitable combiner, such as a power combiner which will combine the optical signals without reference or consideration of the wavelengths of each light 115 associated with the modulated outputs 120 of each signal channel 112. Alternatively, optical combiner 126 may be a wavelength selective combiner, such as an arrayed waveguide grating (AWG). An AWG may provide a lower loss multiplexing structure with respect to a power combiner, while providing a narrow passband for the modulated outputs 120 which may aide in filtering undesirable optical noise. If an AWG is used as the optical combiner 126, a thermal device 126-T, such as a thermal electric cooler or a heater, may be used to shift the passband of the AWG 126 in order to ensure that the bandwidth of the modulated outputs 120 is positioned within the passband of the AWG 126. If a heater is employed as thermal device 126-T, such heater 126-T may be, for example, a resistive thin film heater, such as a platinum heater. The thermal device 126-T may be controlled by frequency controller 140, or other device as part of PIC 110-1, or external to PIC 110-1.

As shown, each signal channel 112 may also include a thermal device 114-T, such as a thermal electronic cooler or a heater, positioned within thermal contact of the light source 114. A heater 114-T may be, for example, a resistive thin film heater, such as a platinum heater. Thermal energy provided by the thermal device 114-T may provide adjustment of the wavelength or carrier frequency of the light 115 exiting the light source 114. Thus, the carrier frequency of each light 115 provided by each light source 114 of each signal channel 112 may be independently controlled to achieve a desired PIC signal channel spacing which, in turn, defines an associated frequency grid. Such frequency grid signal channel spacing may be, for example, 100 GHz or 200 GHz. Control of the thermal device 114-T may be provided by the carrier frequency controller 140 circuit, as discussed below in greater detail with respect to FIG. 3A. The individual carrier frequencies associated with each light source 114 may also be controlled through a bias signal provided to the light source 114, as is known in the art. The bias signal may be a bias voltage or current, and may be provided, as least in part, by the carrier frequency controller 140. Alternatively, thermal energy from thermal device 114-T and the bias signal may be provided to each laser source 114, in combination, to control the carrier frequency of the source 114. Such control signals may be provided, as least in part, by the carrier frequency controller 140 in accordance with the present disclosure.

The PIC 110-1 may also include thermal device 122-T which is positioned to be in thermal contact with each of the signal channels 112, collectively. The thermal device 122-T may then be used to apply thermal energy to the light sources 114 to adjust the carrier frequencies of each of the light sources 114, collectively. Such adjustment allows for the shifting of the associated frequency grid, with respect to a standardized grid for example. The thermal device 122-T may be a heater or a thermal electronic cooler. A heater 122-T may be, for example, a resistive thin film heater, such as a platinum heater. Preferably, each of the thermal devices 114-T are heaters and the thermal device 122-T is a thermal electric cooler. Thus, while each of the thermal devices 114-T provide individual carrier frequency adjustments to each corresponding laser source 114, the thermal device 122-T may provide overall temperature changes collectively to all the light sources 114 to shift the output carrier frequency grid FG-1 of the output optical signal 130-1. In this way, each of the frequency grids FG of each of the output signals 130, provided by a corresponding one of the PICs 110, may be spectrally shifted to provide a desired channel spacing. Such carrier frequency grid shifting may be provided dynamically to continuously obtain a desired channel spacing to achieve higher capacity or longer reach, for example. Additional information regarding the fabrication of PICs 110 may be found in U.S. Pat. No. 7,283,694 entitled "Transmitter Photonic Integrated Circuits (TxPIC) and Optical Transport Employing TxPICs," which is incorporated herein by reference in its entirety.

Figure 2A:
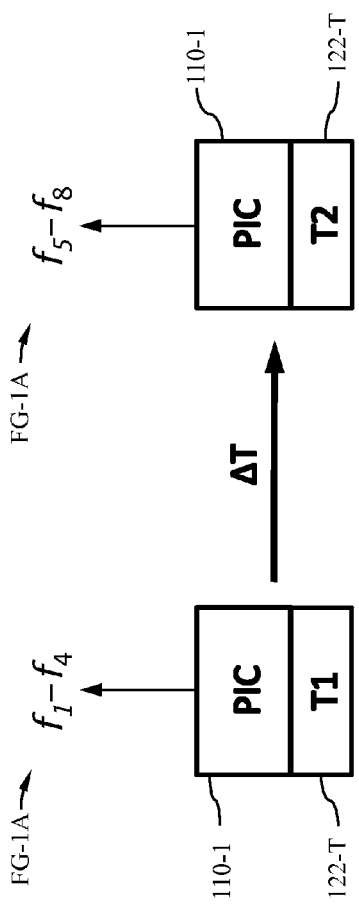
FIG. 2A is a diagrammatic side view of a photonic integrated circuit output carrier frequency shift due to a change in temperature.
Figure 2B:
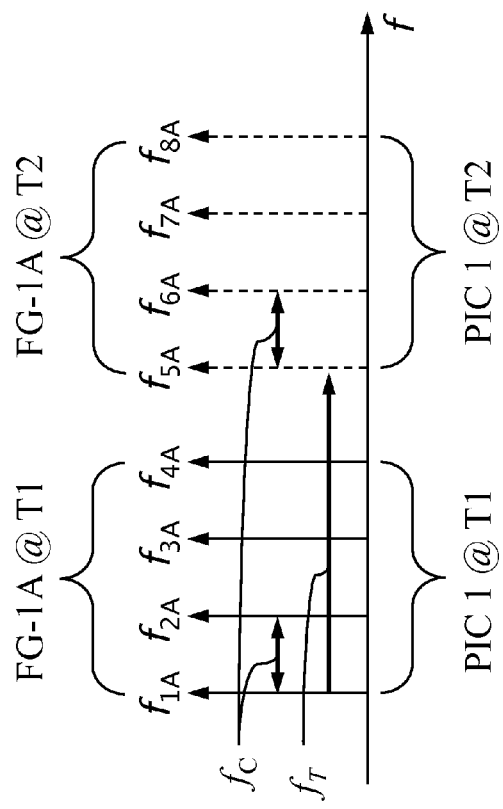
FIG. 2B is a representative example of the carrier frequency shift associated with the photonic integrated circuit of FIG. 2A.

With reference to FIG. 2A-2D, the dynamic shifting of the carrier frequency grids FG of each of the PICs 110 is described in greater detail. FIG. 2A depicts a PIC 110-1 which provides an output signal 130-1 including four modulated optical signals 120-1 through 120-4, each at a different carrier frequency $f_{1A}$-$f_{4A}$, respectively. The output signal 130-1 is described as having four modulated signals 120 for illustration purposes only. The output signal 130-1 may include more or less modulated signals 120, each at a different carrier frequency. The PIC 110-1 includes thermal devices 114-T (as shown in FIG. 1B) which each provide thermal energy to respective light sources 114 to tune the associated individual carrier frequencies $f_{1A}$-$f_{4A}$ of the output signal 130-1, to obtain a desired channel spacing for example. The PIC 110-1 also includes a thermal energy device 122-T positioned to supply the PIC 110-1 with thermal energy such that the PIC 110-1 is at a first temperature T1. Thus, at the first temperature T1, the PIC 110-1 provides the output signal 130-1 including four modulated signals 120 of carrier frequencies $f_{1A}$-$f_{4A}$, respectively, the carrier frequency $f_{1A}$-$f_{4A}$ defining a frequency grid FG-1A. Frequency grid FG-1A may also be referred to as an optical channel group (OCG), e.g. OCG-1. The thermal device 122-T may be controlled, through a signal 142-1T from the carrier frequency controller 140 as shown in FIG. 1B for example, to provide a different thermal energy to the signal channels 112 of PIC 110-1. For example, the carrier frequency controller 140 may provide a voltage or current to the thermal device 122-T, the thermal energy from the thermal device 122-T provided in response to the voltage or current. The different thermal energy results in a temperature change ΔT of PIC 110-1 from the first temperature T1 to a second temperature T2. In response to the temperature change ΔT, the frequency grid FG-1A of the output signal 130-1, spectrally shifts such that the four modulated signals 120 have carrier frequencies $f_{5A}$-$f_{8A}$, respectively. FIG. 2B illustrates the frequency grid FG-1A including carrier frequencies $f_{1A}$-$f_{4A}$ of output signal 130-1 corresponding to the PIC 110-1 (PIC 1) at the first temperature T1. Each of the carrier frequencies $f_{1A}$-$f_{4A}$ are depicted along axis f. The frequency grid FG-1A may include a frequency grid channel spacing $f_G$ between each of the carrier frequencies $f_{1A}$-$f_{4A}$. FIG. 2B also depicts the output signal 130-1 of PIC 110-1 at the second temperature T2. In response to the temperature change from T1 to T2 the frequency grid FG-1A has spectrally shifted an amount $f_T$, the frequencies $f_{5A}$-$f_{8A}$ (in dashed line) representing the carrier frequencies associated with output signal 130-1 of PIC 110-1 at the second temperature T2. The amount $f_T$ the carrier frequency grid FG-1A has spectrally shifted is for illustration purposes only. For example, the amount $f_T$ may be less than the channel spacing $f_C$.

FIG. 2C is an exemplary representation of four PIC devices, PIC 1-4 being similar to PIC 110-1 for example, each having frequency grids FGs including four of the carrier frequencies $f_{1B}$ through $f_{16B}$. Thus, PIC 1 provides an output signal 130-1 having a frequency grid FG-1B including carrier frequencies $f_{1B}$ through $f_{4B}$ defining OCG-1, PIC 2 provides an output signal 130-2 (shown in dashed line) having a frequency grid FG-2B including carrier frequencies $f_{5B}$ through $f_{8B}$ defining OCG-2, PIC 3 provides an output signal 130-3 having a frequency grid FG-3B including carrier frequencies $f_{9B}$ through $f_{12B}$ defining OCG-3, and PIC 4 provides an output signal 130-4 (shown in center line) having a frequency grid FG-4B including carrier frequencies $f_{13B}$ through $f_{16B}$ defining OCG-4. As discussed above, each of the exemplary PIC devices, PIC 1-4, may include thermal devices 114-T for tuning individual channel spacings, as well as the thermal device 122-T to shift the particular frequency grid, e.g. FG-1B through FG-4B, to define the outputs as depicted in FIG. 2C. For illustration purposes only, each of the frequency grids FG-1B to FG-4B is shown as having a frequency grid channel spacing of 200 GHz, however other suitable frequency grid channel spacings are contemplated herein, such as a 100 GHz channel spacing. The four frequency grids FG-1 to FG-4B may or may not conform to an associated standardized wavelength grid, such as an ITU standardized grid. The four PIC 110 output signals 130-1 through 130-4 may then be combined, with optical combiner 132 of FIG. 1A for example, to supply the output signal 133A as illustrated in FIG. 2D.

As shown in FIG. 2D, the combined output signal 133A includes the frequency grids FG-1B through FG-4B of each of the PICs 110-1 through 110-4, respectively. The frequency grids FG-1B through FG-4B overlap such that a portion of each frequency grid overlaps a portion of the remaining frequency grids. Each of the PICs 110-1 through 110-4 are tuned, through operation of thermal devices 114-T, 122-T for example, to provide their corresponding signal channels, e.g. $f_1$ through $f_4$ associated with FG-1B, having individual channel spacing within each frequency grid FG-1B through FG-4B of 200 GHz, as shown in FIG. 2C. Turning back to FIG. 2D, each of the signal channels associated with frequency grids FG-1 through FG-4, however, are offset 50 GHz with respect to adjacent signal channels, e.g. have channel spacings of 50 GHz.

While only the outputs of four PICs 110 are illustrated in the exemplary representation of FIGS. 2C and 2D, the corresponding transmission system 100 may include 10 PICs 110 (e.g. N=10). In this case, only four of the ten PICs 110 are deployed, the remaining six PICs 110 not being deployed in this scenario. FIGS. 2E and 2F provide exemplary representations of combined signals 133 where increasing capacity is desired. The capacity of the transmission system 100 can be increased by utilizing eight PICs 110 instead of the four PICs 110 contemplated in the example of FIGS. 2C and 2D, each of the eight PICs providing an output 130 including ten signal channel outputs 120. In response to control signals 142, for example, eight PICs 110, each providing ten signal channel outputs 120, may be deployed in the system 100, and the channel spacing may change accordingly. As illustrated in FIG. 2E, the combined output signal 133B from the eight PICs 110 of the transmission system 100 would include eight outputs 120, each associated with ten carrier frequencies. The interleaved output signal 133B would include frequency grids FG-1C through FG-8C. The three overlapping frequency grids FG-1C, FG-2C, and FG-8C are partially illustrated. For example, frequency grid FG-1C may include frequencies $f_{1C}$ through $f_{10C}$, frequency grid FG-2C may include frequencies $f_{11C}$ through $f_{20C}$, and frequency grid FG-8C may include frequencies $f_{71C}$ through $f_{80C}$. The optical signals 120 associated with one of the frequency grids FG-1C through FG-8C may be modulated in accordance with a first modulation format, or to carry data at a first data rate, while the optical signals 120 associated with one or more of the remaining of the frequency grids FG-1C through FG-8C may be modulated in accordance with a second modulation format, or to carry data at a second data rate. The optical signals 120 associated with one of the frequency grids FG-1C through FG-8C may have a first channel bandwidth while optical signals 120 of one or more of the remaining frequency grids FG-1C through FG-8C may have a second channel bandwidth. In response to first control signals 142, a first signal channel 11C of frequency grid FG-2C having a frequency of $f_{11C}$ may be spectrally spaced 25 GHz from a first signal channel 1C of frequency grid FG-1C having a frequency of $f_{1C}$, and 175 GHz from a second signal channel 2C of frequency grid FG-1C having a frequency of $f_{2C}$.

The individual single channel spacing, e.g. spectral spacing between the frequency $f_{1C}$ and $f_{11C}$, as well as frequency grid spacing, e.g. the spectral offset between frequency grid FG-1C and frequency grid FG-2C, may be monitored and maintained through signal processing of the output signal 133B by the carrier frequency controller 140 circuitry, as described in greater detail with respect to FIG. 3 below. The channel spacing between adjacent channels of interleaved output 133B may be calculated by dividing the frequency grid channel spacing, e.g. 200 GHz, by the number of PICs 110 utilized, in this case eight PICs 110. While providing higher channel 112 densities, the output signal 133B may be more susceptible to certain transmission impairments, such as nonlinear impairments for example, which may limit the reach of the transmission.

Higher capacity can be achieved by utilizing all ten PICs of the transmission system 100, an interleaved output signal 133C shown in FIG. 2F. The combined output signal 133C would include 100 carrier frequencies. As depicted, the output signal 133C may include the ten frequency grids FG-1D through FG-10D, each including ten signal channels 120. The three overlapping frequency grids FG-1D, FG-2D, and FG-10D are partially illustrated. For example, frequency grid FG-1D may include frequencies $f_{1D}$ through $f_{10D}$, frequency grid FG-2D may include frequencies $f_{11D}$ through $f_{20D}$, and frequency grid FG-10D may include frequencies $f_{91D}$ through $f_{100D}$. The optical signals 120 associated with one of the frequency grids FG-1D through FG-10D may be modulated in accordance with a first modulation format, or to carry data at a first data rate, while the optical signals 120 associated with one or more of the remaining of the frequency grids FG-1D through FG-10D may be modulated in accordance with a second modulation format, or to carry data at a second data rate. Also, the optical signals 120 associated with one of the frequency grids FG-1D through FG-10D may have a first channel bandwidth while optical signals 120 of one or more of the remaining frequency grids FG-1D through FG-10D may have a second channel bandwidth. As compared with signal 133B of FIG. 2E, in response to second control signals 142 ten PICs 110 may be deployed, each providing an output 130 including ten signal channel outputs 120. With the frequency grid FG channel spacing maintained at 200 GHz, the increase in overall signal channels 120 from 80 signal channels in output signal 133B to 100 signal channels in output signal 133C, will result in a change in the channel spacing. For example, a first signal channel 11D of frequency grid FG-2D having a frequency of $f_{11D}$ may be spectrally spaced 20 GHz from a first signal channel 1D of frequency grid FG-1D having a frequency of $f_{1D}$, and 175 GHz from a second signal channel 2D of frequency grid FG-1D having a frequency of $f_{2D}$. Thus, the channel spacing between individual channels as part of the output signal 133 would change from 25 GHz, as shown in FIG. 2E, to 20 GHz, as shown in FIG. 2F.

The frequency grid, such as the frequency grid of carrier frequencies $f_{1C}$ through $f_{80C}$ of output signal 133B as depicted in FIG. 2E or carrier frequencies $f_{1D}$ through $f_{100D}$ of output signal 133C as depicted in FIG. 2F, may be generalized as follows:

$$f_{Grid} = f_{Initial} + m * \frac{\Delta F}{N} + M * \Delta F \bigg| M \in \{0, 1, 2 \ldots 9\},$$

$$m \in \{0, 1, 2 \ldots N-1\}$$

where:
$f_{Initial}$=initial frequency of the frequency grid;
$\Delta F$=frequency grid channel spacing;
N=number of PICs employed; and
M=number of channels per PIC.

Thus, the frequency grid of FIG. 2E may be defined as having an initial frequency, $f_{Initial}$ of 193.950 THz, a frequency grid channel spacing, $\Delta F$, of 200 GHz, a number of PICs (OCGs) deployed equaling 8, and a number, n, of channels per PIC being 10. The resulting channel spacing would be $$\frac{\Delta F}{N},$$

or 200 GHz/8, or 25 GHz, as depicted in FIG. 2E. Similarly, the frequency grid of FIG. 2F may be defined as having an initial frequency, $f_{Initial}$, of 193.950 THz, a frequency grid channel spacing, $\Delta F$, of 200 GHz, a number of PICs (OCGs) deployed equaling 10, and a number, n, of channels per PIC being 10. The resulting channel spacing would be $$\frac{\Delta F}{N},$$

or 200 GHz/10, or 20 GHz, as depicted in FIG. 2F.

Figure 3A:
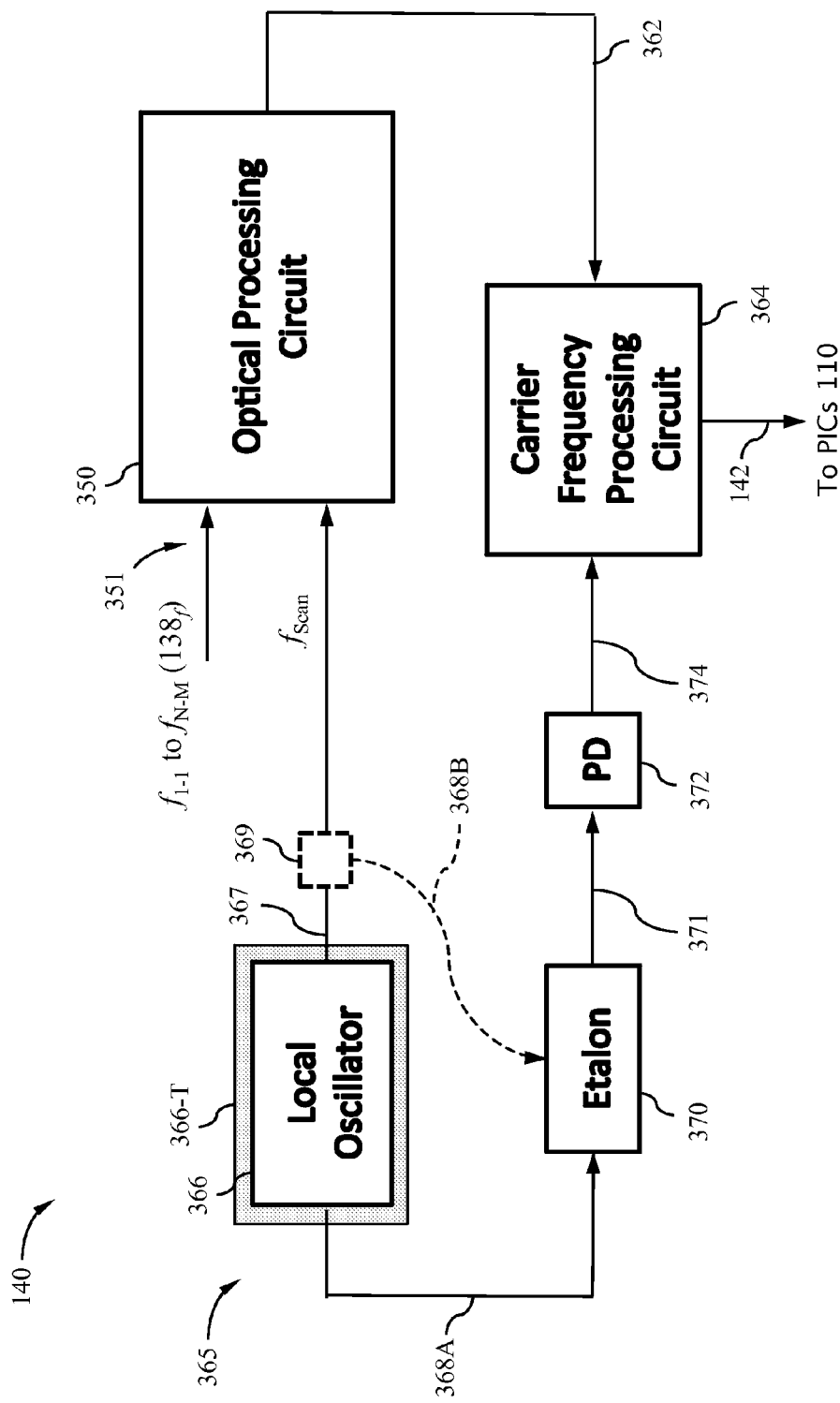
FIG. 3A is a block diagram of an exemplary carrier frequency controller processing circuit, according to certain aspects of the embodiments of this disclosure.

Turning to FIG. 3A, an exemplary carrier frequency controller 140 is depicted. The carrier frequency controller 140 of FIG. 3A is configured to monitor the individual signal channel 112 carrier frequencies, as part of frequency grids FGs associated with PIC 110 optical output signals 130, and adjust the signal channel 112 carrier frequencies as necessary to achieve desired channel spacing in the combined output signal 133. As discussed above with reference to FIG. 1A, the carrier frequency controller 140 may receive a portion of the combined output signal 133 as the signal 138. The signal 138 may include the frequency grids FG which, in turn, include individual signal channel 112 carrier frequencies $f_1$-$f_M$ for each of the number, N, of PICs 110. Thus, the signal 138 may include carrier frequencies $138_f$, represented by $f_{1-1}$ through $f_{N-M}$, where N is the number of PICs 110 and M is the number of signal channels 112 per PIC 110. The carrier frequency controller 140 may include an optical processing circuit 350, a carrier frequency processing circuit 364 and a local oscillator circuit 365. The local oscillator circuit 365, for example, may include a local oscillator 366, an etalon 370 and a photodetector 372, such as a photodiode.

Figure 3B:
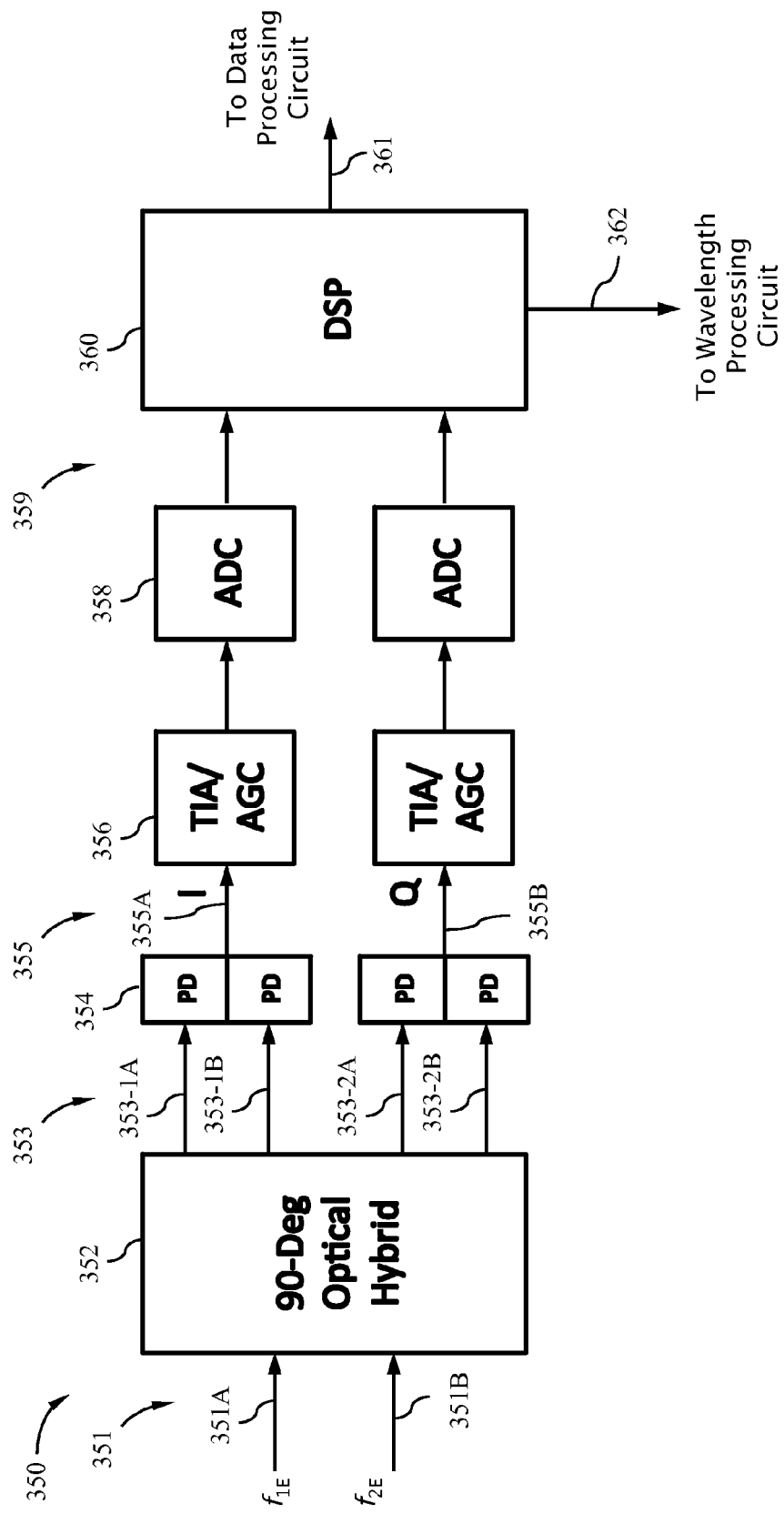
FIG. 3B is a block diagram of additional detail related to the processing circuit of FIG. 3A.

The optical processing circuit 350 may include a coherent detector or receiver circuit, as is known in the art. Turning to FIG. 3B, the optical processing circuit 350 may include a 90-Degree optical hybrid 352 circuit configured to receive two input signals 351 and supply four output signals 353 in response to the received signals 351. For example, a first signal 351A including a carrier frequency $f_{1E}$ and a second signal 351B including a frequency $f_{2E}$, typically provided by an optical oscillator local to the optical hybrid 352, are received by the optical hybrid 352. As is known in the art, the optical hybrid 352 mixes the incoming signals 351 to provide the four output signals 353. A first pair 353-1A, 353-1B of outputs 353 may be provided to a first balanced pair of detectors 364A which converts the first pair 353-1 of outputs 353 into a corresponding electrical signal 355A. Similarly, a second pair 353-2A, 353-2B of outputs 353 may be provided to a second balanced pair of detectors 364B which converts the second pair 353-2 of outputs 353 into a corresponding electrical signal 355B. The signal 355A may represent the in-phase component of the signal 355, while the signal 355B may represent the quadrature component of the signal 355. Each of the signals 355A, 355B are provided to corresponding transimpedance amplifiers/automatic gain controllers 356A, 356B and analog to digital converters 358A, 358B, respectively, prior to being provided to a digital signal processor (DSP) 360 as signals 359. As is known in the art, the DSP 360 may be configured to apply signal process algorithms to the signals 359 to provide an output 361 from which the amplitude and phase of the input signal 351A may be determined, and ultimately the data encoded within input signal 351A, if desired.

When the frequency $f_{2E}$ of the input signal 351B is close to the carrier frequency $f_{1E}$ of the input signal 351A, output 361 is generated by optical processing circuit 350. That is, when the frequencies $f_{1E}$ and $f_{2E}$ are close to the same value, optical mixing in the optical hybrid 352 results in an output 353. Outputs 353 are further processed by the optical processing circuit 350 to generate output 361. The DSP 360 may be configured to provide an output signal 362 indicative of the frequency $f_{2E}$ of signal 351B being close to the carrier frequency $f_{1E}$ of signal 351A. Thus, when the frequencies $f_{1E}$, $f_{2E}$ are close, the output signal 362 may be provided to include an amplitude, A, at a carrier frequency corresponding to the carrier frequency $f_{1E}$, and when the frequencies $f_{1E}$, $f_{2E}$ are not close, the output signal 362 may have an amplitude less than A. If the frequency $f_{2E}$ of the input signal 351B is configured to scan or sweep through an associated frequency range $f_{Range}$ of, e.g. from $f_{S-Min}$ through $f_{S-Max}$, the output signal 362 will indicate the carrier frequencies $138_f$ present in the signal 351A which are within the associated frequency range $f_{Range}$. The input signal 351B may be configured to sweep through the range of frequencies $f_{Range}$ when verification of the carrier frequencies $138_f$ is desired, for maintaining proper channel spacing for example. Alternatively, the input signal 351B may be further configured to continuously sweep through the range $f_{Range}$ to continuously monitor and maintain the channel spacing, or other characteristics, associated with the signals 120. Such an output signal 362 is depicted in FIG. 3C, where the carrier frequencies present in the signal 138 are identified as carrier frequencies $138_\lambda$. The carrier frequencies $138_f$ are within the associated range of frequencies $f_{Range}$, e.g. from $f_{S-Min}$ to $f_{S-Max}$. Turning back to FIG. 3A, the output signal 362 from the optical processing circuit 350 may be provided to the carrier frequency processing circuit 364, and processed as discussed in greater detail below.

The output signal 362 may provide an indication of the carrier frequencies $138_f$ present in the input signal 138. Carrier frequencies $138_f$ are preferably associated with the carrier frequencies of the individual signal channels 112 of the transmission system 100. The oscillator circuit 365 provides a reference from which the carrier frequencies $138_f$ can be compared to associate each one of the carrier frequencies with a corresponding PIC 110. Once the carrier frequencies $138_f$ are associated with their PIC 110, the channel spacing of the output signals 130 may be maintained at desired levels, as described in greater detail above.

The oscillator circuit 365 includes the local oscillator 366 which supplies first light 367 at a frequency $f_{Scan}$ to the optical processing circuit 350, as input 351B for example. The local oscillator 366 may be a laser source, for example a DFB laser or a DBR laser. The local oscillator 366 is configured to provide the first light 367 at a frequency $f_{Scan}$ which scans or sweeps through an associated range of frequencies $f_{S-Range}$, $f_{S-Min}$ through $f_{S-Max}$ for example, at a known sweep rate $f_{S-Rate}$. The frequency $f_{Scan}$, also referred herein as scanning frequency $f_{Scan}$, may sweep in a single direction from $f_{S-Min}$ to $f_{S-Max}$ or from $f_{S-Max}$ to $f_{S-Min}$. Alternatively, the frequency $f_{Scan}$ may repeatedly sweep in the single direction, or back and forth from $f_{S-Min}$ to $f_{S-Max}$ to $f_{S-Min}$, for example. The range of frequencies $f_{S-Range}$ is selected such that the carrier frequencies $138_f$ present in the signal 138 are associated with a bandwidth which is within the range of frequencies $f_{Scan}$. Thus, while providing the signal 138 as the first input 351A signal and the first light 367 at the scanning frequency $f_{Scan}$ as the second input 351B signal, the optical processing circuit 350 would provide an output 362 which would identify the carrier frequencies $138_f$ present in the signal 138.

Local oscillator 366 may provide a second light 368A at the frequency $f_{Scan}$, e.g. the scanning frequency $f_{Scan}$, to the etalon 370. Alternatively, the oscillator circuit 365 may include optional tap 369 (in dashed line) which may be configured to receive the first light 367 from the oscillator 366 and divert a portion of the light 367 as light 368B (in dashed line) to the etalon 370, the remainder of the first light provided to the optical processing circuit 350 for example. If the light 368B is used, the light 368A would not be necessary. The etalon 370 provides an output 371 to photodetector 372 which converts the received optical signal 371 into a corresponding electrical signal 374, which is then provided to carrier frequency processing circuit 364 for further processing. The etalon 370, as known in the art, may include a resonant structure configured to provide an output signal at a known amplitude if the wavelength of the associated frequency $f_{Scan}$ the light 368A resonates with respect to the resonant structure of the etalon 370. FIG. 3D depicts an exemplary output 374, as provided by the etalon 370 and photodiode 372 for example, over the second light 368A frequency $f_{Scan}$ associated with the frequency range of $f_{S-Min}$ to $f_{S-Max}$. As the frequency of second light 368A scans through the frequency range, when the associated frequency $f_{Scan}$ is close to a resonant frequency $f_E$ of the etalon, an output at the corresponding frequency $f_E$ is provided by etalon 370. Thus, the output 374, as depicted, represents the output of etalon 370 over the entire range of frequencies $f_{S-Range}$. Since the output 374 has a specific amplitude which differs with respect to the range of frequencies $f_{E-Range}$, from $f_{E-Min}$ to $f_{E-Max}$ as shown, the frequency associated with the frequency $f_{Scan}$, when close to one of the frequencies $f_E$, is known. The etalon 370 has a frequency range of $f_{E-Range}$, for example extending from $f_{E-Min}$ to $f_{E-Max}$, the range $f_{E-Range}$ being selected such that the frequencies associated with carrier frequencies $138_f$ present in signal 138 are within the range $f_{E-Range}$, as depicted. Since the etalon 370 provides outputs at specific frequencies over the range of frequencies $f_{Scan}$ present in the light 368A, etalon 370 may be considered an optical filter which passes only selected known frequencies $f_E$.

The carrier frequency processing circuit 364 may superimpose the signal 362 from optical processing circuit 350 over the known frequencies $f_E$ generated by the output 374 from the etalon 370. Since the frequency associated with frequencies $f_{Scan}$ of second light 368A sweeps at a know rate $f_{S-Rate}$, and the etalon 370 provides an output at known frequencies $f_E$, as provided by signal 374, carrier frequencies $138_f$ can be associated with the individual PICs 110 to define associated frequency grids FG within the frequencies $138_f$. Once the frequency grids FG have been associated with their originat-ing PICs 110, the individual channel 112 spacing of each PIC 110, can be controlled or set to a desired amount by the carrier frequency processing circuit 364 through the output signals 142, e.g. the control signals 142, of the carrier frequency controller 140, as discussed above with respect to FIG. 1A. For example, the carrier frequency processing circuit 364 can determine a time period from an intensity peak of the etalon 370 output $f_E$ and the detection of a signal 362, the signal 362 indicative of a respective one of a plurality of carrier frequencies $138_f$. The time period can then be multiplied by the sweep rate $f_{S-Rate}$ to provide a frequency offset, which can then be added to the intensity peak frequency to provide the frequency of interest, e.g. the frequency associated with the detected signal 362.

Since the carrier frequency controller 140 can associate individual signal channel frequencies with signal channels 112 of the PICs 110, in addition to controlling the channel spacing, the carrier frequency controller 140 may be employed in controlling other characteristics of the transmission system 100, or the components which make up the transmission system as described and contemplated herein. The characteristics may be monitored and maintained at desired levels, through application of the control signals 142 for example, to enhance or compensate the performance of the transmission system, in light of any impairments which may be present. Such characteristics may be related to the optical signals 120 provided by the signal channels 112, such as a laser 114 bias signal, a modulator 118 bias signal, or a gain provided by the AVE 116, to control a power of the output signal 120 for example.

Figure 4B:
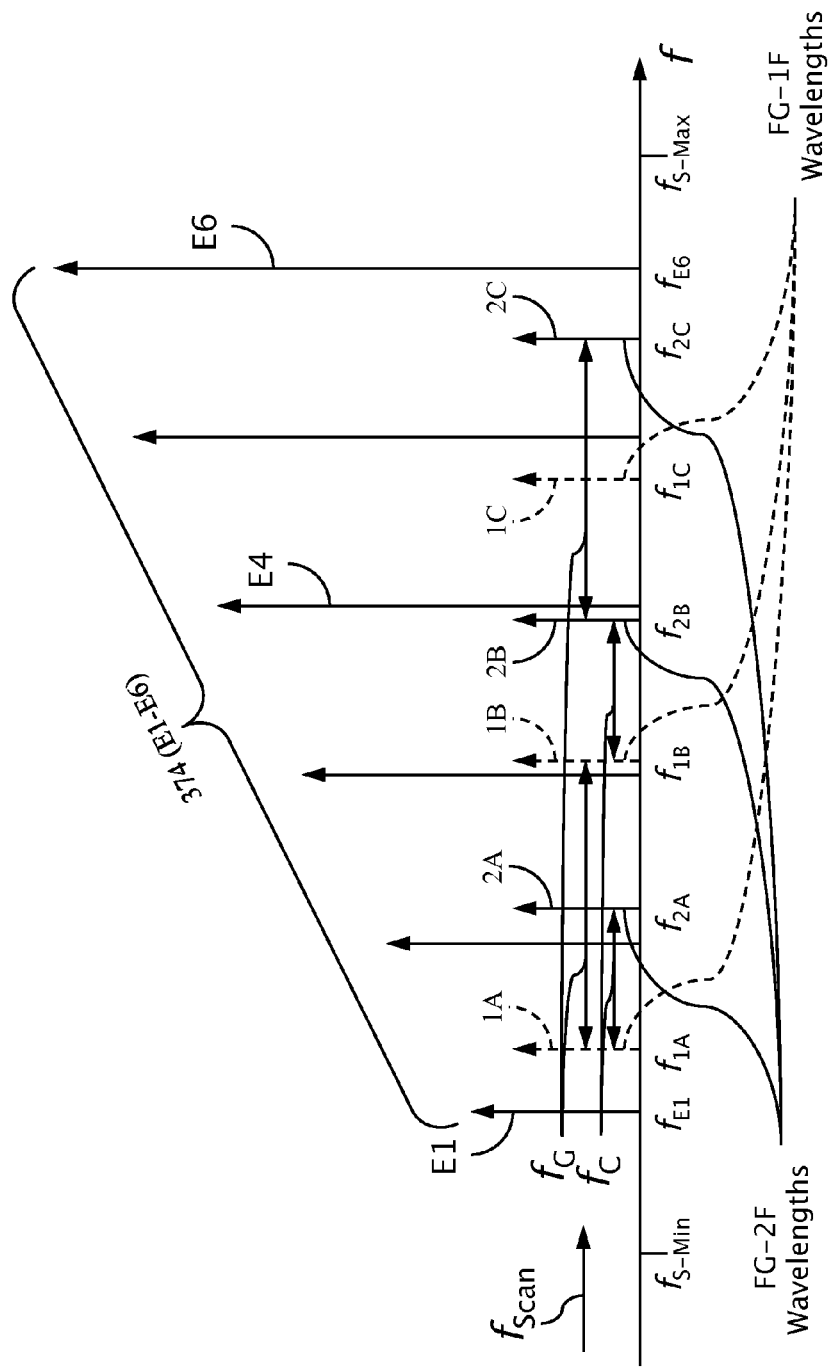
FIG. 4B is an exemplary representation of the frequency grids of FIG. 4A processed by the carrier frequency controller processing circuit of FIG. 3A.

Turning to FIGS. 4A and 4B, an example of dynamically controlling the signal channel 112 spacing of a combined signal such as signal 138 including a plurality of carrier frequencies, utilizing the carrier frequency controller 140 of FIG. 3 will be discussed in greater detail. For purposes of simplicity, only selected carrier frequencies of the output of only two PICs 110 will be described. FIG. 4A depicts an interleaved output from two PICs 110, PIC 1 and PIC 2 (in dashed line). In accordance with the present disclosure, PIC 1 supplies an output 130-1 which includes a number of signal channel outputs, each at a respective one of eight carrier frequencies identified as carrier frequencies $f_{1F}$ through $f_{8F}$. The carrier frequencies $f_{1F}$ through $f_{8F}$ define a frequency grid FG-1, each of the signal channel outputs of PIC 1 being spaced by an amount $f_G$, which may be 100 GHz or 200 GHz for example. Similarly, PIC 2 may supply an output 130-2 (in dashed line) which includes a number of signal channel outputs, each at a respective one of eight carrier frequencies identified as carrier frequencies $f_{9F}$ through $f_{16F}$. The carrier frequencies $f_{9F}$ through $f_{16F}$ may define a frequency grid FG-2, each of the signal channel outputs of PIC2 being spaced by an amount $f_G$, which may be 100 GHz or 200 GHz for example. The individual channel 112 spacings between each channel of frequency grid FG-1 and an adjacent signal channel of frequency grid FG-2 is represented by $f_C$. In accordance with the above discussion regarding transmission system 100, the signal 130-1 may be interleaved, or otherwise combined, with signal 130-2 by optical combiner 132 to form a combined output signal 133. A portion of the output signal 133 is diverted to the carrier frequency controller 140, as the signal 138 for example. Signal 138 thus includes individual signals having carrier frequencies $f_{1F}$ through $f_{16F}$. In accordance with the discussion above, the optical processing circuit 350 will provide an output 362 over an associated frequency range $f_{Scan}$ as depicted in FIG. 3C, the output 362 indicative of the carrier frequencies present in the signal 138, as represented by $138_f$. Additionally, the oscillator circuit 365 of wavelength controller 140 provides a signal 374 which includes defined outputs at associated frequencies $f_E$ over a portion of the frequency range $f_{S\text{-}Range}$, from $f_{S\text{-}Min}$ to $f_{S\text{-}Max}$ for example, as depicted in FIG. 3D. The carrier frequency processing circuit 164 then processes the signals 362 and 374 to provide control signals 142 to maintain the proper channel spacing $f_C$ and frequency grid channel spacing $f_G$. More specifically, as illustrated in FIG. 4B, the carrier frequency processing circuit 164 superimposes the signal 362, represented by signals 1A-1C, and 2A-2C, over the signal 374. For simplicity, the etalon 370 provides an output 374 having six intensity peaks $E_1$ through $E_6$, collectively referred to as output E, at corresponding frequencies $f_{E1}$ through $f_{E6}$, respectively. As discussed above with respect to FIG. 3D, each of the peaks $E_1$ through $E_6$ of output E has an associated amplitude, respectively. Portions of frequency grids FG-1, FG-2 are depicted for simplicity, the bandwidth of each of the frequency grids FG-1, FG-2 being within the bandwidth of the etalon 370 output E, e.g. within the range of frequencies $f_{E1}$ through $f_{E6}$. Additionally, as shown, the bandwidth of the etalon 370 output E are within the frequency range $f_{S\text{-}Range}$ associated with the frequency $f_{Scan}$.

In operation, the frequency $f_{Scan}$ sweeps through associated frequencies from $f_{S\text{-}Min}$ to $f_{S\text{-}Max}$ in the direction of arrow $f_{Scan}$ at a known rate $f_{S\text{-}Rate}$. When the frequency $f_{Scan}$ associated with the frequency $f_S$ is equal to a frequency $f_E$ corresponding to a peak of the etalon 370 output E, an output signal 374 of a specific amplitude is generated. For example, as the frequency $f_{Scan}$ sweeps toward $f_{S\text{-}Max}$, at some point $f_{Scan}$ equals $f_{E1}$ resulting in the output peak E1 from etalon 370. As the frequency $f_{Scan}$ continues to scan toward $f_{S\text{-}Max}$, frequency $f_{1A}$ associated with a carrier frequency of a signal 1A of grid FG-1 is reached. Since the frequency $f_{Scan}$ sweep rate $f_{S\text{-}Rate}$ is known and the time difference between the point where $f_{Scan}$ equaled $f_{E1}$ and when $f_{Scan}$ equaled $f_{1A}$ can be determined, or otherwise measured, the frequency $f_{1A}$ associated with signal 1A can be determined. Similarly, the carrier frequencies associated with the remaining signals 1B, 1C and signals 2A-2C can be determined.

In order to provide the proper control signals 142 to the proper PIC 110-1, 110-2, the carrier frequency controller 140 needs to also associate each signal 1A-1C and 2A-2C with the proper frequency grid FG-1, FG-2. The originating PIC 110 can be determined, for example, through manipulation of the frequency grids FG, e.g. spectrally shifting one frequency grid FG at a time, or through tone assignments associated with the frequency grids FG. Each of the frequency grids FG-1, FG-2 may be adjusted at known periods of time to define the frequency grids with respect to the various signals 1A-1C and 2A-2C of FIG. 4B. For example, the thermal device 122-T of a first of the frequency grids FG-1 can be adjusted via a control signal 142-1 to PIC 110-1. In response to a corresponding temperature change, the frequency grid FG-1 will spectrally shift and, thus, the carrier frequencies $f_{1A}$ through $f_{1C}$ associated with the signals 1A through 1C, respectively, will shift and their association with frequency grid FG-1 by the carrier frequency controller 140 will be established. A similar process can be performed regarding the frequency grid FG-2, to associate carrier frequencies $f_{2A}$ through $f_{2C}$ associated with signals 2A-2C with frequency grid FG-2. Once the individual carrier frequency associations for each frequency grid FG have been identified, the frequency $f_{Scan}$ can be repeatedly scanned to monitor the individual carrier frequencies $f_{1A}$ through $f_{1C}$ and $f_{2A}$ through $f_{2C}$, the carrier frequency controller 140 providing control signals 142 to the PICs 110 to continuously maintain proper channel spacing $f_C$.

Alternatively, a different tone may be applied to each frequency grid FG of each PIC 110 output 130, as is known in the art. For example, the bias applied to the light sources 114 of a PIC may each include an oscillating signal or tone such that the amplitude is dithered in accordance with the tone or the output wavelength of the light output from the light sources 114 may be dithered in accordance with the tone. The carrier frequency controller 140 can then identify each of the frequency grids FG, of signal 138 for example, from the associated tones. More information regarding the use of identifying individual wavelengths, and associated carrier frequencies, of combined signals, such as signal 138, may be found in U.S. Pat. No. 7,283,694, issued Oct. 16, 2007, which is incorporated by reference herein in its entirety.

Figure 5:
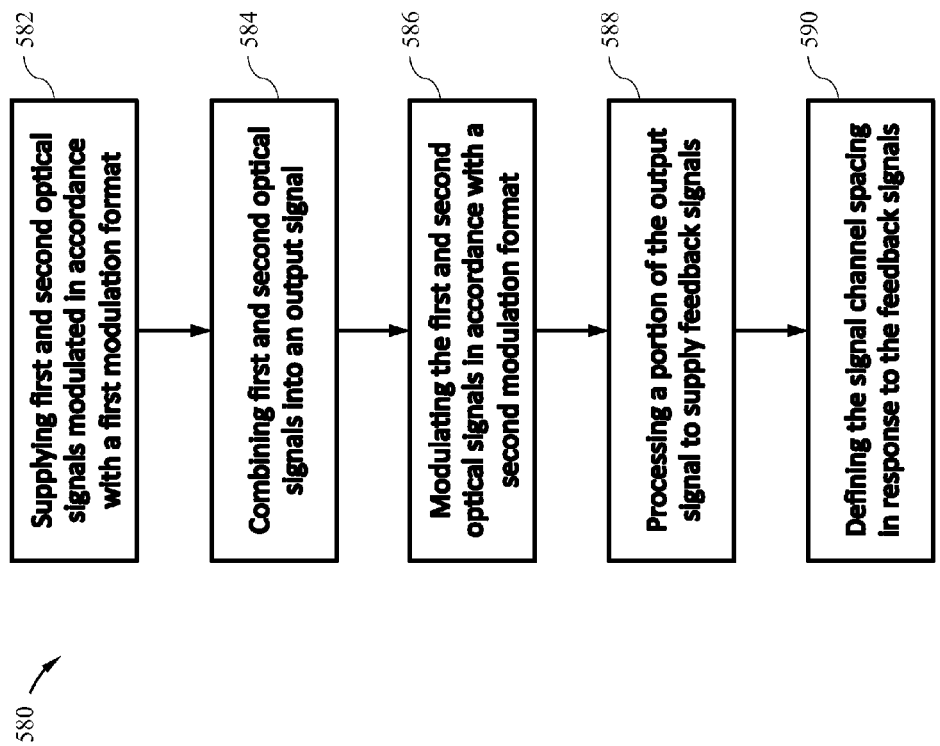
FIG. 5 is a method of processing carrier frequency grids to maintain proper channel spacing between the various carrier frequencies, according to certain aspects of the embodiments of this disclosure.

Turning to FIG. 5, an exemplary method of controlling variable channel spacing, in accordance with certain embodiments described herein where a change in capacity is obtained through a change in the modulation format employed, will be discussed in greater detail. First and second optical signals are provided in a step 582. The first optical signals may be provided by a first PCI 110-1, and the second optical signals may be provided by a second PIC 110-2. Each of the first and second optical signals include channels spectrally spaced to define corresponding first and second frequency grids, such as FG-1 and FG-2. The first and second frequency grids FG-1, FG-2 overlap and are spectrally spaced to define a first channel spacing. The first and second optical signals may be modulated in accordance with a first modulation format and combined into an output signal in a step 584, a WDM signal for example. Upon a desired change in capacity, the first and second optical signals may be modulated in accordance with a second modulation format in a step 586. A carrier frequency controller, such as carrier frequency controller 140, may determine a second channel spacing in response to the second modulation format, the carrier frequency controller supplying control signals in a step 588. The control signal may be provided to first and second optical circuits associated with supplying first and second optical signals, respectively. For example, the frequencies associated with the frequency grids FG-1, FG-2 may be shifted in response to the control signal in step 590 to provide for a second channel spacing. The second frequency grid spacing may be different than the first frequency grid spacing to provide necessary signal channel spacing in accordance with the utilization of the second modulation format.

While the various embodiments of the disclosure have been described in conjunction with several specific embodiments, it is evident to those skilled in the art that many further alternatives, modifications and variations will be apparent in light of the foregoing description. Thus, the embodiments described herein are intended to embrace all such alternatives, modifications, applications and variations as may fall within the spirit and scope of the appended claims.

What is claimed is:

1. An apparatus, comprising:
a first circuit including an oscillator and a filter, the oscillator supplying light having a frequency which sweeps at a sweep rate from a first one of a plurality of frequencies to a second one of the plurality of frequencies, a first portion of the light being provided to the filter which filters the first portion of the light to provide a filtered output having an intensity peak at a third one of the plurality of frequencies;
a second circuit configured to receive a second portion of the light from the first circuit on a first input and an optical signal on a second input, said optical signal having a fourth one of the plurality of frequencies, the second circuit configured to provide an output signal in response to the second portion of the light and the optical signal, the output signal being indicative of said fourth one of the plurality of frequencies; and a third circuit configured to provide a control signal based on, at least, the filtered output of the first circuit, the output signal of the second circuit, and the sweep rate, wherein the control signal is configured to control a corresponding one of a plurality of characteristics associated with said optical signal wherein the third circuit is configured to determine a time period by measuring time from the intensity peak to the detection of the output signal, an offset frequency determined by multiplying the sweep rate by the time period, said fourth one of the plurality of frequencies being determined by adding the offset frequency to the third one of the plurality of frequencies of the intensity peak.

2. The apparatus of claim 1, wherein the filter includes an etalon configured to receive the first portion of the light and provide the filtered output as a filtered optical output including the intensity peak at the third of the plurality of frequencies.

3. The apparatus of claim 2, wherein the first circuit further includes a photodetector configured to receive the filtered optical output and convert the filtered output into a filtered electrical output, the filtered electrical output being provided by the first circuit as the filtered output.

4. The apparatus of claim 3, wherein the first circuit includes an optical coupler having an input and two outputs, the input of the coupler receiving the light, the first portion of the light being provided at the first output of the optical coupler and the second portion of the light being provided at the second output of the optical coupler.

5. The apparatus of claim 3, wherein the oscillator is a laser and the light includes a first light supplied by a first end of the laser and a second light supplied from a second end of the laser, the first portion of the light being the first light.

6. The apparatus of claim 5, wherein the oscillator is a distributed feedback laser.

7. The apparatus of claim 5, wherein the oscillator is a distributed Bragg reflector laser.

8. The apparatus of claim 1, wherein the second circuit is a coherent detector.

9. The apparatus of claim 8, wherein the coherent detector includes a 90-degree optical hybrid configured to receive the optical signal and the second portion of the light.

10. The apparatus of claim 1, wherein the optical signal is supplied by a modulated source.

11. The apparatus of claim 10, wherein the modulated source includes a laser and a modulator, the optical signal being output from the modulator.

12. The apparatus of claim 11, wherein the modulated source further includes an amplitude varying element configured to provide a gain to the optical signal.

13. The apparatus of claim 12, wherein the plurality of characteristics are selected from a group including an optical power of the optical signal, a phase of the optical signal, a carrier frequency of the optical signal, a carrier frequency of an output of the laser, a wavelength of the optical signal, a wavelength of the output of the laser, the gain of the amplitude varying element, a bias of the laser, and a bias of the modulator.

14. The apparatus of claim 11, wherein the signal channel includes a thermal device configured to adjust a temperature of the laser, the temperature of the laser being set in response to the control signal.

15. The apparatus of claim 14, wherein the thermal device is a heater.

16. The apparatus of claim 14, wherein the thermal device is a thermo-electric cooler.

17. The apparatus of claim 1, wherein the intensity peak of the filtered output is a first of a plurality of intensity peaks of the filtered output, each of the plurality of intensity peaks being associated with a respective one of the plurality of frequencies.

* * * * *